(12) United States Patent
Banjanin et al.

(10) Patent No.: US 7,094,204 B2
(45) Date of Patent: Aug. 22, 2006

(54) CODED EXCITATION IMAGING FOR USE WITH BIPOLAR, UNIPOLAR AND OTHER WAVEFORMS

(75) Inventors: Zoran Banjanin, New Castle, WA (US); Linxin Yao, Bellevue, WA (US); Patrick L. Von Behren, Bellevue, WA (US)

(73) Assignee: Siemens Medical Solutions USA, Inc., Iselin, NJ (US)

( * ) Notice: Subject to any disclaimer, the term of this patent is extended or adjusted under 35 U.S.C. 154(b) by 0 days.

(21) Appl. No.: 10/226,954

(22) Filed: Aug. 23, 2002

(65) Prior Publication Data

US 2004/0039283 A1 Feb. 26, 2004

(51) Int. Cl.
*A61B 8/00* (2006.01)

(52) U.S. Cl. .................................................. 600/443

(58) Field of Classification Search ............... 600/443, 600/447, 458, 437, 455–456; 73/625, 626; 128/915, 916
See application file for complete search history.

(56) References Cited

U.S. PATENT DOCUMENTS 5,014,712 A    5/1991   O'Donnell
5,113,278 A *  5/1992   Degura et al. ............ 398/199

(Continued)

OTHER PUBLICATIONS

"Progress In Medical Imaging," by Vernon L. Newhouse, ed., 1980.

(Continued)

*Primary Examiner*—Francis J. Jaworski

(57) ABSTRACT

Sidelobe levels of bipolar and unipolar waveforms are suppressed. Bipolar and unipolar transmit waveforms are generated with a coded excitation, such as a chirp coding, and pulse width modulation. For harmonic, such as second harmonic, imaging, the fundamental transmit frequency of the transmit waveform is centered at a lower end of the bandwidth of the transducer. The transducer filters higher frequency components of the transmit waveform differently than lower frequency components. To generate the desired acoustic waveform, the transmit waveform generated for application to the transducer is adjusted to account for the frequency response of the transducer. For example, higher frequency parts of a chirp waveform has more pulse width modulation or narrower pulse widths to account for lesser magnitude reductions. Multiple transmit waveforms may be combined to reduce sidelobes for fundamental or second harmonic imaging. Two coded excitation waveforms are generated. One waveform is delayed relative to the other waveform, such as applying a 90° phase difference or $$\frac{\pi}{2}$$

delay of one waveform relative to the other waveform. The coded excitation waveforms are then combined. For example, the two waveforms are summed for application to a transducer element. As an alternative example, the waveforms are transmitted from different elements of the transducer array and sum in the acoustic domain.

33 Claims, 2 Drawing Sheets

U.S. PATENT DOCUMENTS

| | | | |
|---|---|---|---|
| 5,675,554 A | | 10/1997 | Cole et al. |
| 5,833,614 A | | 11/1998 | Dodd et al. |
| 5,913,823 A | * | 6/1999 | Hedberg et al. ............ 600/443 |
| 5,924,991 A | * | 7/1999 | Hossack et al. ............ 600/443 |
| 5,984,469 A | | 11/1999 | Koike et al. |
| 6,050,945 A | | 4/2000 | Peterson et al. |
| 6,074,346 A | | 6/2000 | Oppelt |
| 6,078,169 A | | 6/2000 | Petersen |
| 6,083,164 A | | 7/2000 | Oppelt et al. |
| 6,095,977 A | | 8/2000 | Hall et al. |
| 6,135,963 A | * | 10/2000 | Haider ....................... 600/447 |
| 6,146,328 A | | 11/2000 | Chiao et al. |
| 6,193,659 B1 | * | 2/2001 | Ramamurthy et al. ...... 600/443 |
| 6,213,947 B1 | | 4/2001 | Phillips |
| 6,241,674 B1 | | 6/2001 | Phillips et al. |
| 6,622,560 B1 | * | 9/2003 | Song et al. ................... 73/606 |

OTHER PUBLICATIONS

"Coded Excitation System for Improving the Penetration of Real–Time Phased–Array Imaging Systems," by Matthew O'Donnell, Senior Member, IEEE; IEEE Transactions on Ultrasonics, Ferroelectrics, and Frequency Control; vol. 39, No. 3, pp. 341–351; May 1992.

* cited by examiner

US 7,094,204 B2

CODED EXCITATION IMAGING FOR USE WITH BIPOLAR, UNIPOLAR AND OTHER WAVEFORMS

BACKGROUND

The present invention relates to ultrasound transmitters and methods for transmission that suppress sidelobe levels in coded excitation ultrasound imaging. Sidelobes cause imaging artifacts. The sidelobes are spatially offset energy away from the desired location. This would create artifacts around the desired imaging targets.

Coded excitations have been used to reduce or cancel sidelobes. High bandwith transmitters capable for long time transmissions are used for coded excitation waveforms, such as chirp, Baker, Golay etc. coded waveforms. A combination of one or more of phasing, amplitude and frequency changes are coded into a transmit pulse. On receive, a filter applies a more or less modified inverse of the coding to isolate desired information, canceling or reducing sidelobe information. For example, in Golay coding, two sequential transmissions have orthogonal phases after receive processing. The responsive receive sets of data are auto-correlated or convolved. The addition of convolved sequences cancels or reduces the oppositely phased sidelobe levels. However, the Golay coding uses two transmissions for sidelobe suppression, resulting in halving the frame rate. As another example, linear or sinusoidal waveforms with chirp coding are generated. A single transmit chirp coded excitation provides axial sidelobe suppression with an improved frame rate as compared to the Golay coding example. However, the transmitters or waveform generators used to form linear chirp signals are complex and expensive.

Another method of sidelobe suppression is transmission of rectangular waveforms. Unipolar and bipolar ultrasound transmitters generate energy at harmonic frequencies of the desired fundamental transmit frequency. Harmonic energy may result in increased sidelobe levels on the receive side. U.S. Pat. No. 5,833,614 discloses using pulse width modulation to suppress the harmonic content of transmitted bipolar and unipolar waveforms. The width of the unipolar and bipolar pulses within a transmit waveform are varied as a function of a desired window.

BRIEF SUMMARY

The present invention is defined by the following claims, and nothing in this section should be taken as a limitation on those claims. By way of introduction, the preferred embodiments described below include methods and transmitters for suppressing sidelobe levels in ultrasound imaging. Bipolar and unipolar transmit waveforms are generated with a coded excitation, such as a chirp coding, and pulse width modulation.

In another aspect for harmonic, such as second harmonic imaging, the fundamental transmit frequency of the transmit waveform is centered at a lower end of the bandwidth of the transducer. The transducer filters higher frequency components of the transmit waveform differently than lower frequency components. To generate the desired acoustic waveform, the transmit waveform generated for application to the transducer is adjusted to account for the frequency response of the transducer. For example, higher frequency part of a chirp waveform has more pulse width modulation or narrower pulse widths to account for lesser magnitude reductions.

In a third aspect, multiple transmit waveforms may be combined to reduce sidelobes for fundamental or second harmonic imaging. Two coded excitation waveforms are generated. One waveform is delayed relative to the other waveform, such as applying a 90° phase difference or $$\frac{\pi}{2}$$

delay of one waveform relative to the other waveform. The coded excitation waveforms are then combined. For example, the two waveforms are summed for application to a transducer element. As an alternative example, the waveforms are transmitted from different elements of the transducer array and sum in the acoustic domain.

Any one or combinations of two or more of the above described aspects for reducing sidelobe levels may be used. Further aspects and advantages of the invention are discussed below in conjunction with the preferred embodiments.

BRIEF DESCRIPTION OF SEVERAL VIEWS OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Inexpensive, nonlinear bipolar or unipolar transmitters are used for coded excitation ultrasound imaging. Coded excitation ultrasound imaging in combination with pulse width modulation suppresses sidelobe levels. The pulse width modulation may also be responsive to the native filtering of the transducer to provide the desired acoustic waveform at the face of the transducer, resulting in further axial sidelobe suppression. In one embodiment, one coded excitation waveform is delayed relative to another coded excitation waveform. The two waveforms are combined for a single transmit event. The combination results in a reduction in sidelobe levels.

Figure 1:
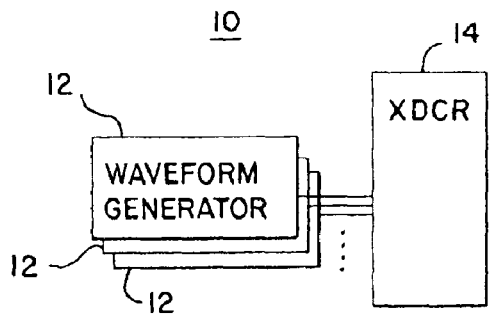
FIG. 1 is a block diagram of one embodiment of an ultrasound transmitter.

FIG. 1 shows an ultrasound transmitter 10 for suppressing sidelobe levels in ultrasound fundamental or harmonic imaging. The transmitter 10 includes a plurality of waveform generators 12 connected with a transducer 14. Additional or different components may be provided. Each waveform generator 12 connects with one or more elements in the transducer 14.

The waveform generator 12 comprises a transmit beamformer, a memory and digital analog converter, a transistor network, a single transistor, or other analog or digital circuitry for generating a unipolar, bipolar, sinusoidal, or other transmit waveform of one or more cycles. For example, the waveform generator 12 comprises two or more transistors networked to connect with a ground, a high voltage and a low voltage for generating a bipolar waveform. As another example, the waveform generator 12 comprises any of the transmit beamformers disclosed in U.S. Pat. No. 5,833,614, the disclosure of which is incorporated herein by reference. In alternative embodiments, the waveform generators 12 comprise transmit beamformers disclosed in U.S. Pat. Nos. 5,675,554, 6,083,164, 6,078,169, 6,074,346, and 6,050,945, the disclosures of which are incorporated herein by reference.

The waveform generator 12 also includes control and timing circuits, such as digital or analog devices for controlling the transition between different amplitude levels. For example, a bipolar transmitter responsive to a 160 MHz timer or sampling clock frequency is provided, but other slower or faster clock frequencies may be used. In one embodiment, the waveform generator 12 generates waveforms with fewer than four amplitude levels (e.g., bipolar has three levels +,0, and − while unipolar has two +, and 0). Due to the analog nature some waveform generators 12, amplitude level as used herein allows for transition and ringing around the desired amplitude level.

The waveform generator 12 generates a transmit waveform which is a function of one or both of pulse width modulation and coding. The transmit waveforms may be a function of other parameters such as amplitude and phase modulation.

The transducer 14 comprises a single element, one-dimensional array, or multi-dimensional array of elements. The elements are micro-electromechanical (MUT) or piezo-electric elements for transducing between acoustic and electrical energy. The transducer 14 receives waveforms generated by the waveform generator 12 and converts the electrical waveform to acoustic energy. The acoustic energy travels within a patient and reflects from tissues and fluids. The transducer 14 receives the reflected acoustic energy and generates responsive electrical signals.

The electrical signals generated by the transducer 14 for receiving acoustic energy are provided to a receive beamformer and filter or processor. The filter or processor apply the inverse of the coding used for the transmit waveform. For example, a matched finite impulse response filter or other time or frequency domain filtering is provided. If the inverse coding is applied to in-phase and quadrature or base band information, a complex filter may be used. A real or non-complex filter may be provided for ratio frequency information. Resulting information is detected and processed for generating an ultrasound image, such as a B-mode or flow-image.

Figure 2:
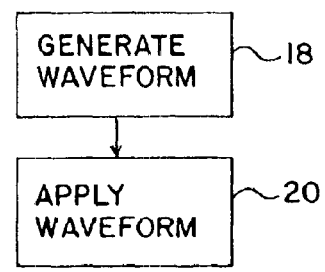
FIG. 2 is a flow diagram of one embodiment of a method for transmitting ultrasound waveforms.

FIG. 2 shows a transmit method for suppressing sidelobe levels in ultrasound imaging. In act 18, a waveform is generated. The waveform is applied to the transducer in act 20. Additional acts may be provided.

Figure 3:
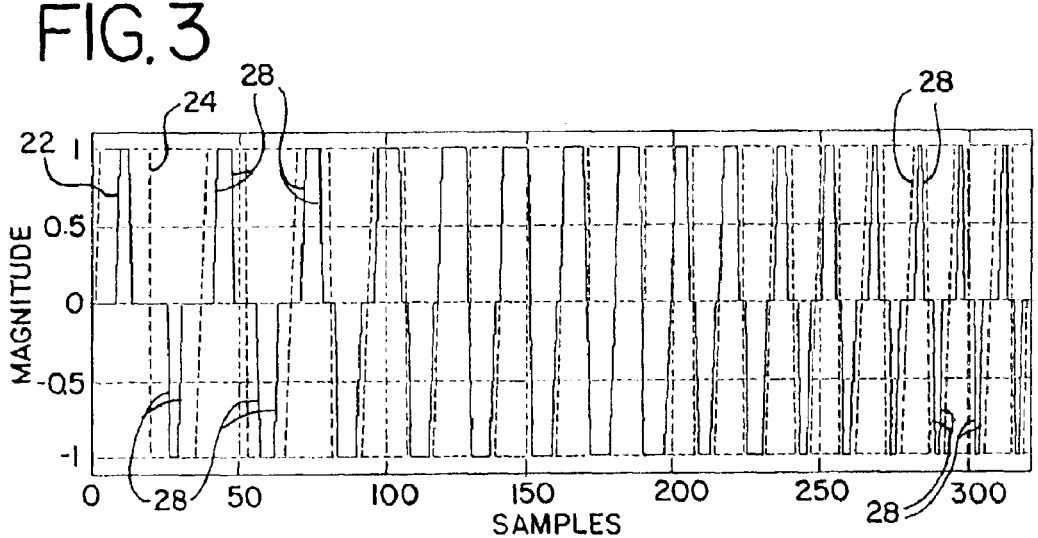
FIG. 3 is a graphical representation of a chirp coded and a pulse width modulated chirp coded excitation waveforms.

In one embodiment of act 18, the waveform generated is a unipolar or bipolar waveform. FIG. 3 shows two different bipolar waveforms 22, 24. The magnitude of the waveforms 22, 24 as shown is a normalized magnitude. The bipolar waveforms 22, 24 have fewer than four amplitude levels, such as using two or three amplitude levels. Each bipolar waveform 22, 24 is associated with three different amplitude levels of a 1, −1 and 0. As represented by waveform 24, only two, such as 1 and −1 of the amplitude levels may be used.

In alternative embodiments, a unipolar waveform is provided with two amplitude levels of 0 and 1 or 0 and −1. In yet other alternative embodiments, a greater number of amplitude levels are provided, such as five or more amplitude levels for more closely resembling a sinusoidal waveform.

Figure 4:
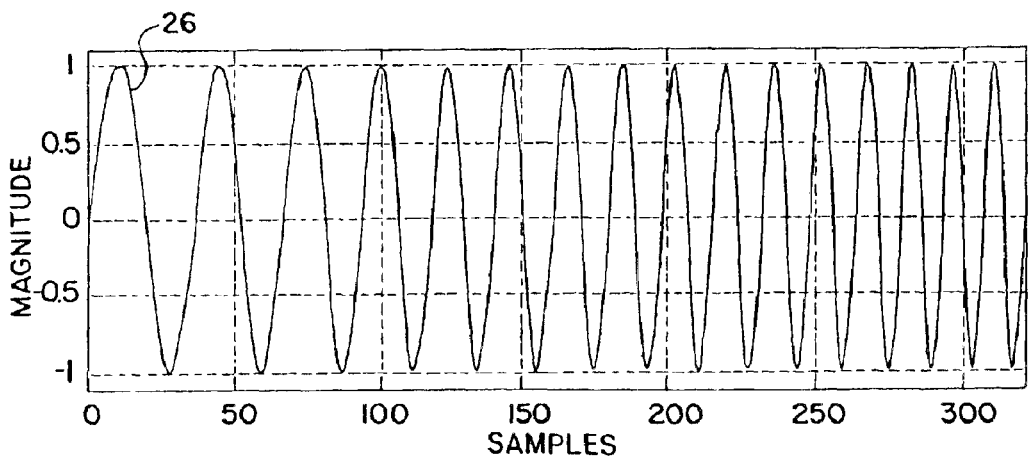
FIG. 4 is a graphical representation of one embodiment of a sinusoidal chirp waveform.

The waveform generator in act 18 is responsive to coding. Coded excitation is implemented through one or combinations of two or more of phase, amplitude and frequency changes within the transmit waveform as a function of time or between sequential transmit waveforms. Any one of various types of coding may be used, such as chirp or frequency swept coding, Golay coding, or Barker coding. For example, the Golay coding described in U.S. Pat. Nos. 5,014,712; 5,984,469; 6,095,977 and 6,146,328, the disclosures of which are incorporated herein by reference, is used. As another example, a chirp coding is provided. The chirp spans any of various frequency ranges, such as a range within 2–12 MHz. In one embodiment, a 1 to 10 MHz wide frequency linear sweep is provided by the chirp waveform. FIG. 4 shows a sinusoidal linear chirp waveform 26. The chirp coding begins at the lower end of the frequency range of the chirp and ends at the higher frequency range, but chirps beginning with a high frequency component and ending with a low frequency component may be used. The frequency within the waveform varies linearly or in response to non-linear or other function. A chirp waveform is described by the following equation:

$$Ss(t) = \text{window}(t) * \sin((w0 - BW/2 + Sl*t/2)*t) \tag{1}$$

where w0 is the center frequency, BW is the bandwidth and sl is the slope of the linear chirp. For a bipolar transmitter or waveform, a square wave approximation of the sinusoidal chirp is provided where:

$$Sq(t) = 1, \text{ for } Ss(t) > 0, \tag{2}$$
$$= -1, \text{ for } Ss(t) > 0,$$
$$= 0, \text{ elsewhere}$$

The dashed waveform 24 of FIG. 3 represents implementation of the FIG. 4 chirp coded excitation in a bipolar waveform. As in FIG. 4, the lower frequency components are provided at samples 0–150, and the higher frequency components are provided at samples 150–300. As a result, the width of the pulses 28 at lower numbered samples is greater than the width of the pulses 28 at higher numbered samples. While chirp coding is discussed above, other coding, such as Golay, Barker, phase, amplitude, or frequency coding may be provided. U.S. Pat. Nos. 6,213,947 and 6,241,674, the disclosures of which are incorporated herein by reference, disclose various coded excitations.

Figure 5:
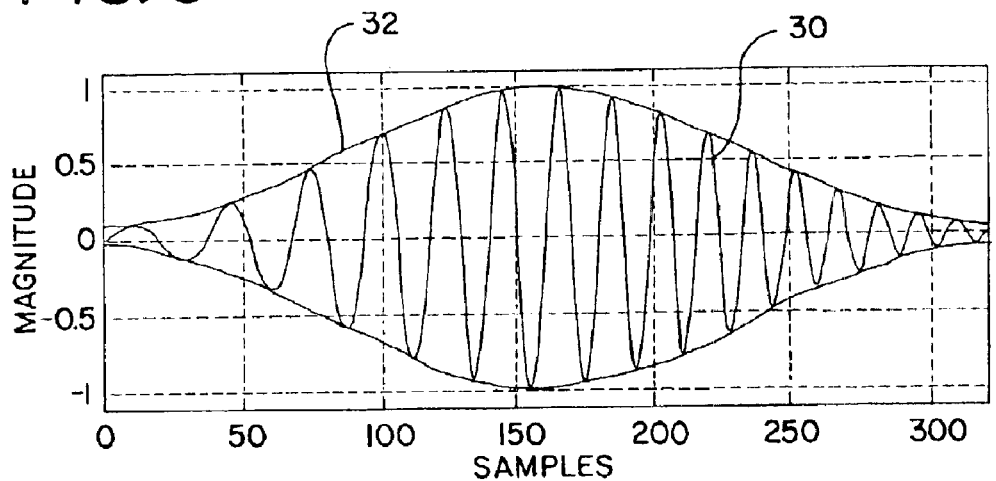
FIG. 5 is a graphical representation of one embodiment of a sinusoidal chirp coded excitation waveform with an Gaussian envelope.

FIG. 5 shows an idealized sinusoidal chirp waveform 30. The chirp bipolar waveform 24 of FIG. 3 incorporates coding of the ideal waveform 30 but not the amplitude modulation. Since bipolar waveforms are generated with few amplitude levels, pulse width modulation is used to reduce harmonic content without amplitude modulation, reducing the sidelobe levels. Pulse width modulation changes the width of pulses throughout a transmit waveform. The width is modulated to provide a desired energy magnitude content of the waveform. For example, the pulse width modulation is responsive to an envelope function that rises gradually and falls gradually, such as a Gaussian, Hamming or other function. Pulse width modulation adjusts the width of individual positive or negative pulses within a waveform comprising a plurality of sequential positive and/or negative pulses without requiring different amplitude levels.

There may be various methods to perform pulse width modulation. One is to make the bipolar rectangular pulse with the same area as the desired waveform pulse. The width may be determined using various functions. One method can be mathematically represented as:

$$Spwm(t) = 1, \text{ for } S(t) > f(\text{window}(t)), \quad (3)$$
$$= -1, \text{ for } S(t) < -f(\text{window}(t)),$$
$$= 0, \text{ elsewhere.}$$

where $$f(\text{window}(t)) = 1 - f(\text{window}(t)), \quad (4)$$
$$S(t) = \sin((w0 - BW/2 + S1*t/2)*t)$$

window (t) is a normalized window with a maximal value of 1. The window represents the desired amplitude envelope function, such as a Gaussian, Hamming or other function. The envelope 32 of the ideal waveform 30 of FIG. 5 represents the window or envelope function. The envelope 32 rises gradually and falls gradually for minimizing harmonic content. The solid line bipolar waveform 22 (e.g. Spwm(t)) of FIG. 3 represents the bipolar implementation of pulse width modulation of the chirp coded bipolar waveform 24 (e.g. Sq(t)). The width or time duration of each pulse 28 (e.g. positive or negative pulse of Spwm(t)) is modulated as a function of the desired envelope. Pulses 28 at the beginning and end of the waveform are narrower than at the middle of the waveform. Likewise, the pulses 28 are narrower at the beginning and end of the waveform than the pulses would be without pulse width modulation. Where the width or duration of a pulse 28 is reduced for pulse width modulation, the zero magnitude level or amplitude is generated to maintain a same frequency of the pulses.

Since the width of each pulse 28 is also a function of the frequency associated with the pulse, chirp coded excitations also affect the width of pulse width modulated pulses 28. For example, the pulses 28 associated with low frequency components (the beginning of the transmit waveform as shown in FIG. 3) are wider or longer than the pulses 28 associated with the high frequency components (e.g. the end or higher samples of the bipolar waveforms 22, 24 shown in FIG. 3). In alternative embodiments, the coded excitation does not alter the width of the pulses. The pulse width modulated bipolar chirp waveform 22 provides a more compact spectrum with fewer harmonics than the bipolar chirp waveform 24. As a result, the pulse width modulated bipolar chirp waveform 22 provides reduced axial sidelobes after convolution on the receiver side.

In act 20, the generated transmit waveform is applied to the transducer 14 (FIG. 1). The transducer 14 converts the applied electrical transmit waveform to an acoustic waveform.

The frequency response characteristic of the transducer 14 may alter the waveform. The acoustic waveform generated at the face of the transducer is effectively a filtered version of the electrical transmit waveform applied to the transducer 14. The frequency response of the transducer 14 may be accounted for in the generation of the transmit waveform or may not be considered. As a result of accounting for the transducer response, a more desired waveform is generated in the acoustic domain. The waveform generator 12 of FIG. 1 generates any of the transmit waveforms discussed above with an amplitude spectrum function that varies as a function of the frequency response characteristic of the transducer. For example, a bipolar or unipolar transmit waveform is generated so that the acoustic energy at the face of the transducer has less second harmonic energy than the electrical waveform applied to the transducer to generate the acoustic waveform. Frequency components of the electrical transmit waveform associated with greater filtering by the transducer 14 are emphasized to account for the greater filtering. For example, a bipolar chirp coded excitation transmit waveform is generated for second harmonic imaging. Since the same transducer 14 is used for both transmit and receive processing, the fundamental transmit frequencies of the chirp coded excitation transmit waveform are positioned at a lower frequency portion of the bandwidth of the transducer 14. In this portion of the bandwidth, the frequency response of the transducer 14 more greatly filters or removes information associated with lower frequencies.

To counteract the difference in transducer filtering as a function of frequency, the pulse width modulation is adjusted to generate the transmit waveform with greater amounts of energy. Less pulse pulses narrowing, i.e. pulse width modulation, is applied at lower frequencies as compared to pulses at higher frequencies. The pulse width modulation is a function of the frequency response characteristic of the transducer. The width/duration of the lower frequency pulses 28 is increased relative to the width/duration of the higher frequency pulses 28. In addition to the pulse width modulation being a function of the envelope 32 of the desired waveform, the pulse width modulation also accounts for the frequency response of the transducer 14. For a chirp coded excitation, the pulse widths are responsive to the pulse width modulation and associated envelope signal, the frequency associated with the chirp coding and the frequency response of the transducer 14. For example, pulses 28 associated with higher frequencies of a chirp coded excitation are narrower in response to both less filtering of higher frequency signals by the transducer 14 and the gradually falling amplitude of the envelope function implemented by the pulse width modulation.

Characteristics of the transmit waveform, such as frequency, phasing, amplitude, pulse width or other characteristics, are adjusted to provide a desired amplitude spectrum. Any one or combination of two or more of techniques for accounting the frequency response of the transducer, or reducing sidelobe levels may be used. The electrical waveform applied to the transducer has an amplitude spectral function that varies as a function of the frequency response characteristic of the transducer 14. The variance is approximately an inverse of the transducer frequency response within the bandwidth of the transmitted waveform to counteract the frequency filtering effects of the transducer 14. The amplitude spectrum will have larger amplitudes for lower frequencies than for higher frequencies where the frequency response of the transducer more greatly filters lower frequency components. In alternative embodiments, a coded excitation without pulse width modulation or non-coded excitation waveform with fewer than four amplitude levels is generated with characteristics altered to account for the frequency response of the transducer.

As the signal propagates to a focal region, additional filtering effectively provided by the tissue may be accounted for as well as the frequency response of the transducer 14. Likewise, the spectral response of components of the transmit path for applying the electrical waveform to the transducer 14, such as cabling, digital analog converter, or other components may be counteracted by altering the transmit waveform.

Pulse width modulated encoded excitation waveforms reduce the sidelobe levels generated by bipolar and unipolar transmit pulses. Reduced sidelobe levels may increase visibility of tissue structures, such as cysts, due to improvements in the signal-to-noise ratio. The pulse width modulation reduces range or axial sidelobes due to harmonic information provided by square waves or waves with few amplitude levels. Some sidelobes may be evident due to processes other than the transmission of harmonic information. With chirp coding, lower frequency components may have second harmonics at a same frequency as higher frequencies of the intended fundamental components of the chirp excitation. Such harmonics are not filtered from receive signals since filtering may remove useful information as well. Pulse width modulation reduces the amount of harmonic information from low frequency components introduced at a same frequency as high frequency fundamental components. Pulse width modulation of coded excitation waveforms provides a more controlled or desired transmit spectral design for imaging. For example, tissue harmonic imaging (i.e. imaging at harmonic frequencies without introduction of contrast agents) using pulse width modulated coded excitation waveforms may improve the rejection of fundamental information for isolating the harmonic information.

For harmonic imaging, the fundamental signal cancellation and reduction of axial sidelobes may be further improved by combining information associated with two different transmit pulses. The two pulses are relatively time shifted such that desired harmonics or fundamental frequencies are maximally suppressed, such as transmitting the second pulse with a 90° phase difference from the first pulse in a same transmit event. Similarly combination of two or more waveforms can be used for suppression of harmonics and sidelobe suppression in fundamental imaging.

Figure 6:
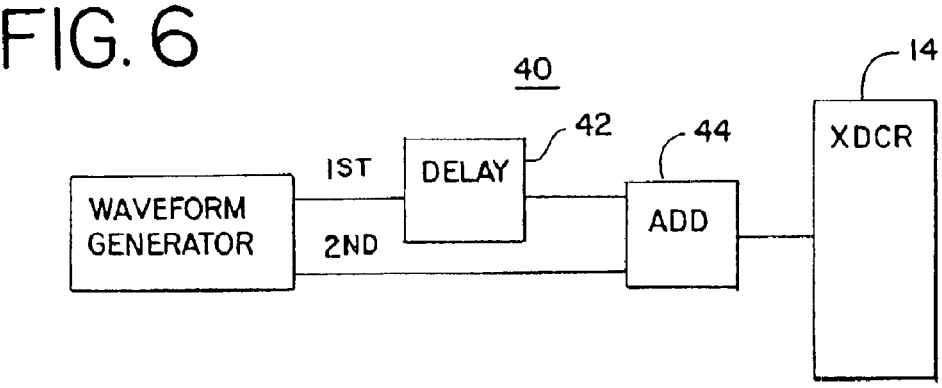
FIG. 6 is a block diagram of another embodiment of an ultrasound transmitter.

FIG. 6 shows an ultrasound transmitter 40 for suppressing sidelobe levels in ultrasound imaging. The transmitter 40 includes a waveform generator 12, a delay 42, an adder 44 and the transducer 14. Additional, different, or fewer components may be used, such as providing two separate waveform generators 12 or a transmitter 40 without the adder 44. In alternative embodiments, the delay 42 and the adder 44 are included as part of the waveform generator 12.

The waveform generator 12 comprises a transmit beamformer or other structure discussed above for generating two coded excitation waveforms. For example, a chirp coded excitation waveform is generated by two different transmit beamformer channels. Separate waveform generators 12 or a same waveform generator 12 forms the two coded excitation waveforms.

The delay 42 comprises a memory or buffer operable to delay one coded excitation waveform relative to another coded excitation waveform. The delay may be for any fraction of a cycle of the waveform, such as a 90°, 180° or 270° phase delay, or for multiple cycles of the waveform. In alternative embodiments, the waveform generator 12 generates the first and second coded excitation signals with different phasing or in response to different start generation signals or timing without an additional delay component 42.

The adder 44 comprises a digital summer, an analog combination of two signal lines or other device for combining analog or digital coded excitation waveforms. The adder 44 combines the coded excitation waveform prior to application to an element of the transducer 14. In alternative embodiments, the adder 44 is removed from the transmitter 40 and the two coded excitation waveforms are applied to different elements of the transducer 14. Once the separate coded excitation waveforms are transmitted as acoustic waveforms, the coded excitation waveform sum in the acoustic domain at the focal point or region.

Figure 7:
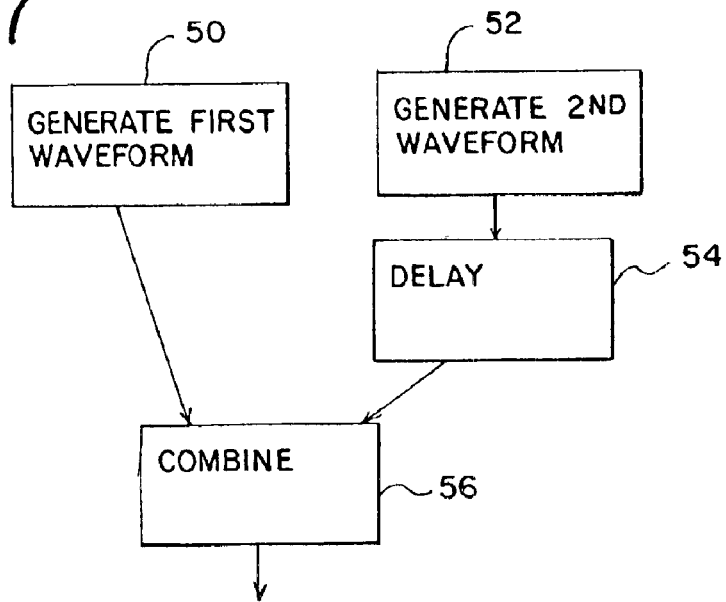
FIG. 7 is a flowchart representing another embodiment for transmitting ultrasound energy.

FIG. 7 shows a flowchart of one embodiment of a transmit method for suppressing sidelobe levels in ultrasound imaging by combining waveforms. The method of FIG. 7 minimizes transmitted information at harmonic frequencies for tissue harmonic or contrast agent harmonic imaging. Imaging at the fundamental frequencies may also be provided. In acts 50 and 52, first and second coded excitation waveforms are generated. For example, two chirp coded waveforms with the same or different frequency ranges are provided. In one embodiment, the coded excitation waveforms are unipolar or bipolar waveforms, but linear or sinusoidal waveforms may be used. Other coding may be used, such as Golay or Barker coding. The coded excitation waveforms may also include pulse width modulation, but may be free of pulse width modulation.

One of the coded excitation waveforms is delayed relative to the other of the coded excitation waveforms in act 54. The delay is implemented through a buffer or memory structure for delaying an analog waveform or digital waveform samples of one waveform relative to another waveform. In alternative embodiments, the delay 54 is implemented by starting the generation of one transmit waveform at a different time than the start of the other transmit waveform. Other delay techniques may be used. The amount of delay is selected to minimize harmonics in the resulting combined transmit waveform. For example, a 90° phase difference of one transmit waveform relative to another transmit waveform is introduced. A 90° phase difference or delay cancels the second harmonic. A 180 degree phase difference or delay results in a combined waveform with twice the number of amplitude levels. For example, two bipolar excitation waveforms are combined, resulting in a four level excitation transmit waveform. A multiple level transmit waveform more closely represents a sinusoid, so fewer harmonics are introduced or the bandwidth of the transmit waveform is narrowed. The two coded excitation waveforms combined in act 56 each have pulses 28 with one amplitude level. For the combined waveform, each pulse 28 steps to a first level, then to a second greater amplitude level, and then back to the first amplitude level before transitioning to the next pulse 28. In other examples, delays may be introduced to subtract one coded excitation from another coded excitation. One coded excitation waveform may be associated with different maximum amplitude levels, such as half, of the other coded excitation waveform. Through the use of various delays and amplitude levels, the resulting combined coded excitation transmit waveform more closely resembles a sinusoidal waveform. For pulse width modulation, the delays are selected such that the pulses of coded excitation pulse width modulation waveforms do not overlap.

Where hardware does not support more than two or three level combinations of two waveforms, second harmonics and resulting sidelobes may be still be suppressed. Second harmonics of lower frequencies of the chirp have harmonics that overlap in frequency domain with higher fundametnal frequencies of the chirp and create sidelobes on receive. Combination of two waveforms may reduce these second harmonics and improve sidelobe levels. Harmonics from the higher frequency part of the chirp are mainly out of the probe bandwidth and are easily rejected by filtering on receive.

The combined coded excitation waveform from act 56 is provided to the transducer 14 (FIG. 6).

In alternative embodiments, the two coded excitation transmit waveforms are combined in the acoustic domain.

For example, each coded excitation waveform is provided to a different transducer element. Once the transducer elements generate acoustic waveforms, the acoustic waveforms superpose or combine in the acoustic domain.

In one embodiment, two pulses associated with Barker coded excitations are delayed relative to each other. Two different combined Barker coded excitation waveforms are generated. The different combined coded excitation waveforms are sequentially transmitted pursuant to the Barker coding scheme.

Since bipolar and unipolar transmitters and transducers may include non-linear components, suppressing harmonic information in transmitted waveforms may be difficult. Rather than experimentation with water tank experiments, simulation models may be provided. In one embodiment, models are responsive to manual adjustment of parameters of the transmit waveforms to provide a desired output waveform. Automatic adjustment may be provided through feedback. Bipolar or unipolar square waves are modeled. The modeled square wave is filtered using a responsive based on transmit components and transducer response. The waveform may be further altered based on expected performance of any received filtering tissue propagation or other received circuitry. The resulting waveform is then analyzed. In one embodiment, the resulting waveform is compared to a desired output waveform with minimized harmonic information. The comparison identifies differences in harmonic content, sidelobes generation or other characteristics. The initial input square wave is then altered based on the differences. The alteration may be automatic where causational or experimentally determined correlations are included within the model. Alternatively, manual adjustment is provided. For example, the frequency, amplitude, pulse width of pulse width modulation, coding, number of cycles, or other square wave characteristic is altered. Iterative or random sampling techniques may be used to identify an input waveform resulting in the desired output waveform. As another example, the quality of a chirp waveform may be increased by increasing the number of amplitude levels (e.g. four or more levels) where the hardware complexity and cost is acceptable. Direct improvement of bipolar chirp is provided by increasing the number of chirp levels and therefore removing of higher harmonics. In another approach, two chirps waveforms are combined into one, resulting in more levels for the purpose of maximal removal of the most troublesome second harmonic.

While the invention has been described above by reference to various embodiments, it should be understood that many changes and modifications can be made without departing from the scope of the invention. It is therefore intended that the foregoing detailed description be understood as an illustration of the presently preferred embodiments of the invention, and not as a definition of the invention. It is only the following claims, including all equivalents, which are intended to define the scope of this invention.

What is claimed is:

1. A transmit method for suppressing sidelobe levels in ultrasound imaging, the method comprising:
   (a) generating a first waveform in response to pulse width modulation in addition to coding, the first waveform being a pulse width modulated, coded waveform and having pulse widths that vary as a function of each of the coding and the pulse width modulation; and
   (b) applying the first waveform to a transducer.

2. The method of claim 1 wherein (a) comprises generating a unipolar waveform.

3. The method of claim 1 wherein (a) comprises generating a bipolar waveform.

4. The method of claim 1 wherein (a) comprises generating the first waveform with chirp coding.

5. The method of claim 1 wherein (a) comprises generating the first waveform with the pulse width modulation being a function of an envelope signal that gradually rises and falls.

6. The method of claim 5 wherein (a) comprises generating the first waveform with wider pulses at a center than at a beginning and end of the first waveform as a function of the pulse width modulation.

7. The method of claim 6 wherein (a) comprises generating the first waveform with wider pulses at the beginning than at the end of the first waveform as a function of chirp coding.

8. The method of claim 1 wherein (a) comprises generating the first waveform with the pulse width modulation responsive to a frequency response characteristic of the transducer.

9. The method of claim 8 wherein (a) comprises generating the first waveform with a chirp coded excitation, the pulse width modulation responsive to both the frequency response characteristic of the transducer and a gradually rising and gradually falling envelope function such that pulses associated with higher frequencies of the chirp coded excitation are narrower in response to both less filtering of higher frequency signals by the transducer and the envelope function.

10. The method of claim 1 further comprising:
   (c) generating a second waveform in response to coded excitation;
   (d) delaying the second waveform relative to the first waveform; and
   (e) combining the first and second waveforms.

11. An ultrasound transmitter for suppressing sidelobe levels in ultrasound imaging, the transmitter comprising:
   a waveform generator operable to generate a first waveform in response to pulse width modulation in addition to coding, the first waveform being a pulse width modulated, coded waveform and having pulse widths that vary as a function of each of the coding and the pulse width modulation; and
   a transducer connected with the waveform generator, the transducer operative to receive the first waveform.

12. The transmitter of claim 11 wherein the waveform generator comprises a unipolar waveform generator.

13. The transmitter of claim 11 wherein the waveform generator comprises a bipolar waveform generator.

14. The transmitter of claim 11 wherein the waveform generator is operable to generate the first waveform with chirp coding.

15. The transmitter of claim 11 wherein the waveform generator is operable to generate the first waveform with the pulse width modulation being a function of an envelope signal that gradually rises and falls.

16. The transmitter of claim 11 wherein the waveform generator is operable to generate the first waveform with the pulse width modulation responsive to a frequency response characteristic of the transducer.

17. The transmitter of claim 11 wherein the waveform generator is operable to generate a second waveform in response to coded excitation; and further comprising:
   a delay operable to delay the second waveform relative to the first waveform; and
   an adder operable to combine the first waveform and the delayed, second waveform.

18. A transmit method for suppressing sidelobe levels in ultrasound imaging, the method comprising:

(a) generating a first waveform having fewer than four amplitude levels, the first waveform having an amplitude spectrum function that varies as a function of a frequency response characteristic of a transducer; and (b) applying the first waveform to the transducer, the frequency response characteristic of the transducer operable to filter the first waveform such that the first waveform has more second harmonic energy than a transmitted acoustic wave at a face of the transducer.

19. The method of claim 18 wherein (a) comprises generating the first waveform in response to pulse width modulation, the pulse width modulation responsive to a frequency response characteristic of the transducer.

20. The method of claim 19 wherein (a) comprises generating the first waveform with a chirp coded excitation, the pulse width modulation responsive to both the frequency response characteristic of the transducer and a gradually rising and gradually falling envelope function such that pulses associated with higher frequencies of the chirp coded excitation are narrower in response to both the envelope function and less filtering of higher frequency signals than lower frequency signals by the transducer.

21. The method of claim 18 wherein (a) comprises generating a unipolar waveform.

22. The method of claim 18 wherein (a) comprises generating a bipolar waveform.

23. The method of claim 18 wherein (a) comprises generating the first waveform with chirp coding, the amplitude spectrum function having larger amplitudes for lower frequency components of the first waveform than for higher frequency components of the waveform where the first waveform is transmitted in a lower range of bandwidth of the transducer.

24. The method of claim 18 wherein (a) comprises generating the first waveform in response to pulse width modulation being a function of an envelope signal that gradually rises and falls and the frequency response of the transducer.

25. An ultrasound transmitter for suppressing sidelobe levels in ultrasound imaging, the transmitter comprising:

a transducer having a frequency response characteristic; and a waveform generator operable to generate a first waveform having fewer than four amplitude levels, the first waveform having an amplitude spectrum function that varies as a function of the frequency response characteristic of the transducer such that a transmitted acoustic energy at the face of the transducer responsive to the first waveform has less second harmonic energy than the first waveform.

26. The transmitter of claim 25 wherein the first waveform comprises a chirp coded waveform and the waveform generator is operable to generate the first waveform with pulse width modulation responsive to a frequency response characteristic of the transducer, the pulse width modulation having narrower pulses for higher frequency pulses based on the frequency response of the transducer.

27. The transmitter of claim 25 wherein the waveform generator comprises a unipolar waveform generator.

28. The transmitter of claim 25 wherein the waveform generator comprises a bipolar waveform generator.

29. A transmit method for suppressing sidelobe levels in ultrasound imaging, the method comprising:

(a) generating a first coded excitation waveform;

(b) generating a second coded excitation waveform;

(c) delaying the second coded excitation waveform relative to the first coded excitation waveform;

(d) adding the first coded excitation waveform to the second coded excitation waveform; and (e) applying the combined waveform of (d) to a transducer.

30. The method of claim 29 wherein (a) and (b) comprise generating first and second chirp coded waveforms.

31. The method of claim 30 wherein combination of (d) results in a waveform with, more amplitude levels than either of the first and second chip coded waveforms.

32. The method of claim 29 wherein (a) and (b) comprises generating the first and second coded excitation waveforms as one of unipolar and bipolar waveforms.

33. An ultrasound transmitter for suppressing sidelobe levels in ultrasound imaging, the transmitter comprising:

a waveform generator operable to generate first and second coded excitation waveforms;

a delay operable to delay the first coded excitation waveform relative to the second coded excitation waveform;

an adder operable to combine the delayed first coded excitation waveform with the second coded excitation waveform; and a transducer connected with an output of the adder.

* * * * *